United States Patent Office 2,766,115
Patented Oct. 9, 1956

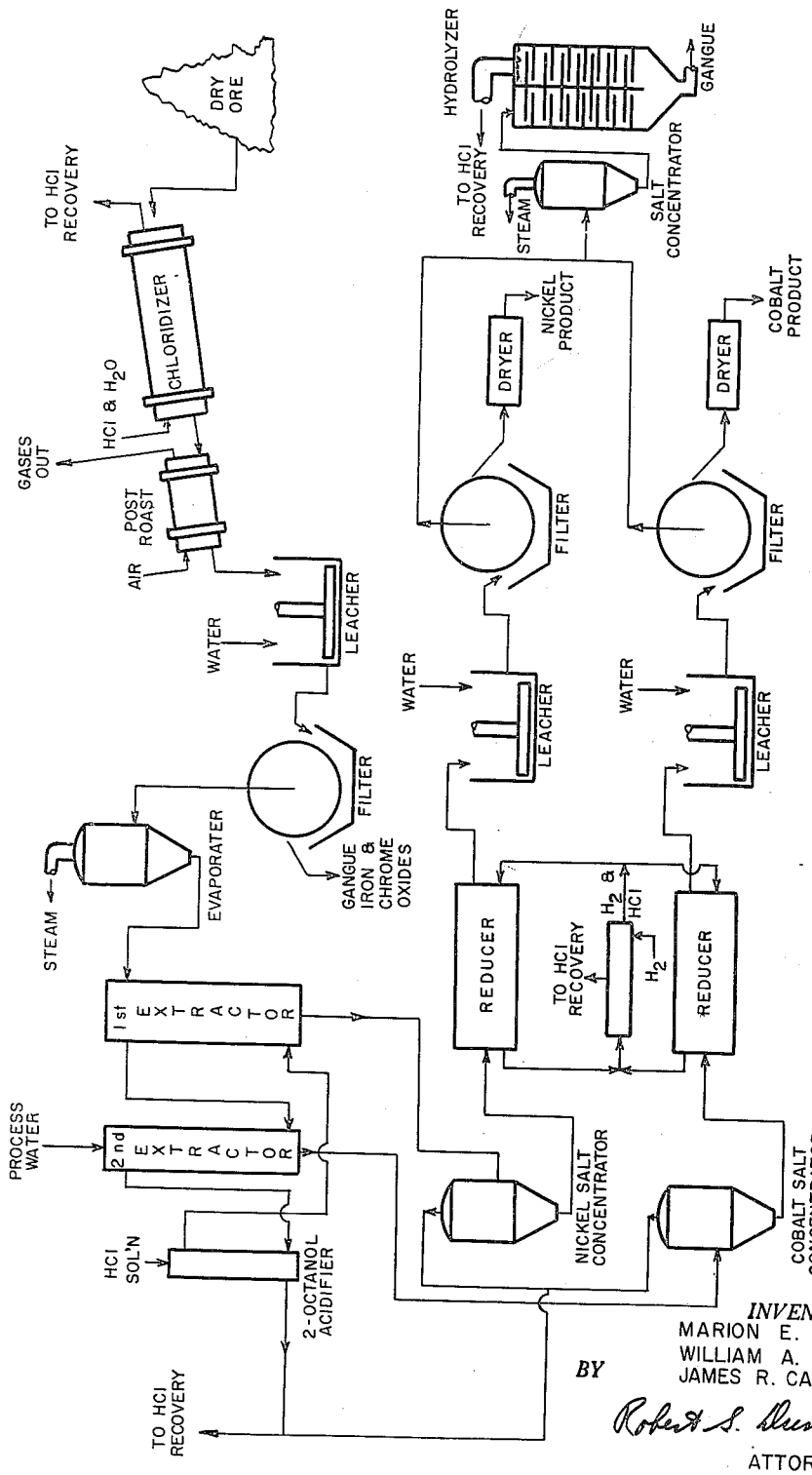

2,766,115

PROCESS OF RECOVERING METAL VALUES FROM COMPLEX ORES CONTAINING IRON AND NICKEL

Marion E. Graham, Parma, William A. Reed, West Richfield, and James R. Cameron, Maple Heights, Ohio, assignors to Republic Steel Corporation, Cleveland, Ohio, a corporation of New Jersey Application February 18, 1955, Serial No. 489,022

14 Claims. (Cl. 75—119)

The present invention relates to a process for recovering metal values from complex ores containing iron and nickel, and more particularly to such a process for recovering nickel and possibly other metal values, from ores, such as lateritic ores found in Cuba, serpentine ores, and possibly other similar types of ore, containing not only iron and nickel, but also either manganese or magnesium or both, as well as possibly cobalt along with the nickel, chromium, gangue material sometimes including calcium compounds, and possibly also small amounts of sulphur. Such ores further frequently include some water which is chemically combined, as well as water in the form of moisture which is not chemically combined.

The present invention further includes, as a subcombination of the subject matter previously set forth, the selective reduction of nickel chloride and/or cobalt chloride from starting materials including these chlorides respectively or jointly in the presence of at least one of the materials: magnesium or manganese chlorides, without at the same time changing substantial amounts of the magnesium or manganese chloride initially present in this starting material to a water-insoluble form. The products of these selective reduction operations, therefore, may be leached to separate the reduced metal or metals from the remaining materials which are still in water-soluble form and hence separable by the leaching operation.

Of these ores, the Cuban lateritic ores are quite fine as to particle size as the ore is mined. Other ores in the general classification to which the present process is applicable include serpentine, which is relatively high in magnesium oxide and has a lower iron content, and which is in the form of relatively large hard particles or lumps as mined.

The present invention seeks to provide a practical and practicable process for separating and recovering nickel from ores of the types hereinabove referred to, either alone or in conjunction with cobalt, or recovering either or both of these two metals, nickel and cobalt, selectively and separately, from the ore. The process further seeks to provide means and process steps by which the iron content of the ore may be segregated from other constituents, which may be termed contaminants from the point of view of recovery of iron, so that iron in an oxide form, with or without gangue, may be recovered as a separate product of the process and hence may be used in other processes, forming no part of the present invention, for the recovering of metallic iron.

As such the present process is extremely valuable at this time in view of the critical nature of the supply of nickel and cobalt available in this country from sources close to and friendly with the United States, so that these sources may be relied upon in case of emergency. The present process further provides an advantageous way in which to recover nickel and/or cobalt from ores of the types mentioned. The above define, therefore, the general objects of the present invention.

Summarizing the present invention, it comprises a process by which ore of this general type is first comminuted as and to the extent necessary and then dried out to remove moisture (non-chemically combined water) and also some, but preferably not all, of the chemically combined water. During the drying process, it is preferred in accordance with one embodiment of the present invention hereinafter described to use a gas containing oxygen, so as to prevent to a maximum extent the reduction of any iron present from a ferric to a ferrous state.

The first principal step of the process, which is preferably preceded by a drying step as aforesaid, but which is an essential step whether or not the drying step is resorted to, is a selective chloridizing step; that is one in which many of the metallic compounds present, other than iron and chromium, are chloridized, while preventing to a maximum extent the chloridizing of any iron or chromium present. This is effected in practice by using a chloridizing gas which is a mixture of gaseous hydrogen chloride (HCl) and water vapor, the essential active ingredients of the gaseous mixture consisting of these two gases in the proportion (by volume or mol) of about 1:2 to about 2:1, the chloridizing reaction taking place within the temperature range of about 400° to about 600° F. and preferably at about 530° F.

The next process step which is preferably used, but may be omitted in certain instances, is what may be termed a "post-roasting" operation, i. e. a hot oxidizing roast followed by a cooling with air of the chloridized solid material, in such a way as to oxidize any iron which has been chloridized to $FeCl_3$ back to $Fe_2O_3$.

The next step, which is essential and used under all circumstances, is to separate the water-soluble salts from the water-insoluble material by a leaching operation, followed by a filtering or decantation type separation. The iron in oxide form (water-insoluble) may then be recovered from the water-insoluble fraction by means forming no part of the present invention.

The water-soluble material resulting as an aqueous solution from the leaching operation is preferably acidified with HCl to establish a predetermined HCl concentration therein, usually from about 5% to about 15%, and may also, in some instances, be concentrated, preferably before the acidification if concentration is resorted to, so as to provide a relatively concentrated solution in which there is from about 75% to 100% saturation of chlorides. This solution, in which all the chlorides are contained in dissolved form, is then extracted with 2-octanol by any suitable agitation procedure to get good contact between these two immiscible liquids. It has been found that during such an extraction procedure, substantially all the cobalt chloride will be dissolved in the 2-octanol phase, along with little or none of the nickel chloride, but along with some of the chlorides of magnesium, manganese and calcium (or whatever chlorides of these metals may be present), plus some HCl. The remainder of the magnesium, manganese and calcium chlorides and HCl which are present initially in the aqueous phase will be found still in the aqueous phase in admixture with the dissolved nickel chloride therein. By suitably controlling the concentration of total chlorides plus the concentration of HCl, the separation between cobalt chloride in the 2-octanol phase and nickel chloride in the aqueous phase may be made substantially complete.

The aqueous phase, which is separated by any liquid-liquid separation from the 2-octanol phase, may then be further processed in any way known in the art for the recovery of nickel therefrom. Specifically, however, there is provided in accordance with the present invention a preferred manner for the further processing of the dissolved metal chlorides from the aqueous phase for the separation and recovery of nickel. This process involves first the evaporation to dryness of the salts in the aqueous phase.

The 2-octanol phase may be suitably treated for the recovery of cobalt therefrom. The first step in this process, in view of the relatively high cost of 2-octanol, is to separate 2-octanol in a condition in which it may be reused as aforesaid from the chlorides which are dissolved therein. This is preferably effected by first extracting the water-soluble chlorides from the 2-octanol phase by a water extraction, which is carried on in any suitable equipment and in any suitable manner. This results again in two phases which are separable to provide reusable 2-octanol on the one hand, and on the other hand an aqueous solution of cobalt chloride along with the chlorides of such other metals as may remain therewith, particularly including some magnesium, manganese and/or calcium chlorides. These mixed chlorides may be suitably treated in any way known to the art for the recovery of cobalt therefrom. The present invention, however, provides a preferred way of recovering cobalt, which is parallel to a large extent to the way hereinafter set forth for recovering nickel and which involves first the evaporation of the water solution of the mixed chlorides to dryness.

The two groups of mixed chlorides are then preferably treated in similar ways, but separately from one another. It will be understood, however, that in the event that for any reason the separation step between nickel and cobalt chlorides by the 2-octanol extraction is wholly omitted, any cobalt chloride present initially following the chloridization step will be admixed with the nickel chloride, so that cobalt may be recovered in metallic form along with the nickel in the way hereinafter set forth for the recovery of nickel. With this exception, the two groups of chlorides are then treated separately and each by a selective reduction step using as a reducing gas a gaseous mixture particularly including HCl and hydrogen and usually also, water vapor. The limiting concentrations of these three gaseous elements are given hereinafter as a function of the temperature in each instance either as absolute concentrations or as ratios of one gaseous concentration to another in a way which will enable those skilled in the art to practice the process and get desired selective reduction so as to enable nickel with or without admixed cobalt to be recovered from the one fraction and cobalt to be recovered from the other. By utilizing proper admixtures of gases as hereinafter set forth, it is possible substantially to prevent conversion of magnesium, manganese and/or calcium chlorides into any water-insoluble form during the selective reductions aforesaid. Thus, at the completion of the selective reduction operations, a leaching operation will be effected to separate the reduced metal in each instance from the remaining water-soluble chlorides. The water-soluble fraction from these leaching operations may then be worked upon by process steps, which per se form no part of the present invention, for recovering magnesium and/or manganese as well as to recover the chlorine (present as chloride), which latter is usually necessary to the economics of the entire process.

The present invention may be more clearly understood by reference to the single figure constituting the accompanying drawing, which illustrates a flow sheet of the present process including certain optional usable, but in some instances unessential, steps thereof.

Turning now to the details of the present process, the first consideration is the drying and, if necessary, comminution of the ore. Under many circumstances, comminution is the first step of the process where this is necessary. The ore is preferably comminuted to about minus 30 Tyler mesh and finer. On the other hand, where lateritic ores, such as Nicaro ore, are used as the raw material for the present process, the ore itself may be sufficiently fine as received from the mine. Some of this ore is so fine that a substantial part of it is minus 325 mesh. The fine particle size of the ore as supplied to subsequent steps of the process is desirable to permit of reasonably complete chemical reaction therewith of the several reactants used.

The next step of the process, which is usually essential, is that of drying but which again is not always essential, is to remove substantially all the moisture the ore, so as to remove substantially all the moisture therefrom, i. e., chemically uncombined water, while also removing a part, but preferably not all, of the chemically combined water. For this purpose, the ore is preferably heated up to a temperature in the range of about 250°–500° F. and in a usual case to about 350° F. The drying action may be carried on in many different types of drying apparatus including, for example, a rotary kiln.

It is desirable that this drying be effected by the use of some oxygen-containing gas, such as air, so as to prevent to a maximum extent, the possible reduction of any iron present in the ore from a ferric to a ferrous state. It is further desirable that the drying be not so severe (as by the use of very high heat) as to drive off all the chemically combined water and particularly the water combined with any nickel compound present, as it is found that if nickel compounds are completely dehydrated, it is difficult in the subsequent step of the process to chloridize the nickel. If, on the other hand, a part only of the chemically combined water is driven off at this stage of the process, the nickel salts present are not completely dehydrated and chloridization thereof may be effected without substantial difficulty. It is noted that many ores of types which are usable in accordance with the present process start substantially yellow in color, probably due to the presence of hydrated hematite therein; while after the completion of the drying and partial dehydration as aforesaid, the ore is quite red with a characteristic hematite color. For this reason, the preferred temperature for this drying operation is usually about 350° F.

Whether the particle size of the material at this stage of the process is an inherent characteristic of the ore itself or whether it is achieved by a comminution operation as aforesaid, it is sometimes found that the material tends to ball up so that when it is completely dry, some of it at least will be in the form of balls of larger or smaller size. In order that the subsequent chloridizing reaction may be effective uniformly and to a maximum degree and in order that this chloridizing reaction be carried on in a minimum of time, it is often desirable to break up these balls of material by some type of attrition means.

The next, and what is always an essential step of the process, is the chloridizing reaction per se. This action can be carried out in any suitable apparatus affording good gas-to-solid contact. Such apparatus may include rotary kilns, furnaces of the Wedge or Herreshoff type, fluidized bed type apparatus, and others which will occur to those skilled in the art.

The purpose in the chloridizing step is to effect the chloridizing of the nickel and/or cobalt present, without chloridizing iron and chromium, and while inevitably and incidentally chloridizing some manganese and magnesium and possibly some calcium, the chloridizing of these metals not being particularly desired, but occurring to a substantial extent. In the case of chromium, there is little or no tendency for this material to be chloridized, so that no special care need be taken for the prevention of the chloridizing of this material. In the case of iron, the tendency to chloridize is very substantial, in the absence of a special precaution, in accordance with the present invention to prevent such chloridizing. This precaution involves the maintenance in the chloridizing gases of a sufficiently high water vapor concentration, so as substantially to prevent the chloridizing of the iron oxide present to the corresponding chloride of iron. It has been found, for example, that the water vapor content should have a substantially predetermined ratio with respect to the concentration of the chloridizing gas, which, in the present process, is gaseous hydrogen chloride. It has further been found that gaseous hydrogen chloride is preferable for use in the chloridizing step to chlorine, for with chlorine, it is much more difficult, if not impossible, to prevent chloridizing of the iron. The proportions of water vapor to gaseous hydrogen chloride to achieve the desired result aforesaid should be between about 1:2 and about 2:1, considered by volume or mol ratio in each instance. The preferred ratio of these gases is usually about 1:1, again by volume or by mol.

The reasons for these ratio limits are as follows: When the ratio of HCl to water vapor is greater than about 2:1, chloridizing can be effected as to the desired nickel and cobalt to be chloridized, but the inhibitory action of water is not sufficiently great to prevent the simultaneous chloridizing of a substantial amount of iron. Thus, from a practical point of view, in order to get the desired selectivity of chloridizing nickel and cobalt, while repressing the chloridizing of iron to a desired extent, the ratio of HCl to water vapor should not substantially exceed 2:1. The other limit, i. e. the minimum limit of the ratio of HCl to water vapor given above as 1:2, is chosen in order that there be a substantial yield of the chloridizing. While it is possible to effect some chloridizing with a lower ratio of HCl to water vapor, the attainment of a reasonable yield requires at least about this ratio, at least at the final portion of the chloridizing, so as to attain commercially practicable results in a reasonable length of time.

The ratio of gases is given in this instance, rather than an absolute percentage, either by volume or weight, based upon the entire volume of gas passing through the chloridizing zone in this step, as it is contemplated that the total amount of gas passed through this zone may include very substantial quantities of some one or more inert gases, such, for example, as nitrogen. The desired results as aforesaid are obtained more or less independently of the absolute or relative amounts of inert gases present when the desired ratio of the HCl to water vapor is maintained within the limits given.

The temperature limits for the chloridizing step are from about 400° to about 600° F., with a preferred temperature of about 530° F. As the temperatures used approach or pass the extreme limits of the range above given, the operation is relatively less efficient or undesirable in its results.

In this connection, it may be pointed out that the importance of the oxidizing character of the drying step now becomes apparent, as this oxidizing type of drying, in effect, prevents ferrous iron being transmitted to the present chloridizing step. It has been found that it is relatively difficult, and sometimes impossible, to prevent the chloridizing of ferrous iron by maintaining desired water vapor concentrations as aforesaid, even though these same water vapor concentrations are practically effective to prevent the chloridizing of ferric iron.

It has also been found when working under desired conditions, over 80% of the nickel present in the ore will be chloridized to nickel chloride (NiCl₂) and corresponding amounts of any cobalt present will be chloridized to cobalt chloride (CoCl₂); while only about 1 part of iron to 300 parts of nickel will be chloridized to iron chloride when the teachings of the present invention are followed.

It has also been found that when magnesium is present in the ore being worked, from about 5% to 20% of the magnesium initially present in the ore will be chloridized to magnesium chloride (MgCl₂); and if manganese is present in the ore, from 50% to 100% thereof will in most instances be chloridized to manganese chloride (MnCl₂).

The chloridizing action is carried on to substantial completion, i. e. as to the nickel and cobalt, respectively, or to such a point that further time devoted to chloridizing is uneconomical. This time can, of course, be determined by experiment for any given ore.

Many samples tested were chloridized for a period of 40 minutes in a rotary kiln, during which over 96% of the nickel was chloridized. The time, however, is closely interrelated with the type chloridizing which is carried on. For example, when chloridizing is done with the ore in a still bed, a substantially longer time, such as 160 minutes, is required to get results comparable with that obtained in 40 minutes in a moving bed established in the rotary kiln as aforesaid. On the other hand, times in the order of magnitude of 30 to 40 minutes even in a moving bed type device seemed to be necessary, as the results obtained in a 20 minute period show substantially less chloridizing.

The next step of the process, which is usually carried out, but which is not an absolutely essential step, is what may be termed "post roasting." The purpose of this step is to compensate for the possible chloridizing of some iron notwithstanding the precautions taken as aforesaid, so that iron which is chloridized may be reconverted to the oxide form and preferably to the form of Fe₂O₃.

In effecting the post roasting, air is passed over the solid material after it has been removed from the chloridizing zone and preferably is in a roasting zone. This air, and the moisture it may carry, serves while the solid material is still hot to assure that the iron present is in its higher state of oxidation and also serves thereafter to cool the chloridized solid material from the relatively high temperature that it had in the chloridizing zone and during the initial part of the post roasting steps down to room temperature.

Another function of the post roasting is to strip from the solid material gaseous HCl which may be either absorbed or adsorbed therein so as to prevent this HCl being dissolved in the water in the next or leaching step hereinafter described. In the event that any substantial amount of HCl is carried into this leaching step, it will dissolve in the water and will tend to react with iron present to convert it to one or the other of the chlorides of iron, which as stated above is undesired in this process. It has been found that the post roasting operation as herein described, using air to sweep past the solid material, will purge it to a very substantial extent of HCl irrespective of how that HCl is contained in the material as aforesaid.

In a preferred embodiment of the invention, the air passed through the post roasting zone in contact with the solid material therein and which, of course, picks up some heat from the chloridized ore being cooled, may be used to transmit this heat to the initial drying zone for drying the incoming ore. This effects a saving in heat.

The preferred temperature control during post roasting is to hold the chloridizing temperatures of the solid material for about 5 to 15 minutes, following which the solid material is cooled down. This may be effected practically by employing heated air for an initial period, followed by the use of air at progressively cooler temperatures (less pre-heat), and finally followed by the use of air at room temperature. The air is preferably passed through the post roasting zone countercurrent to the movement of ore therethrough, in the event that the ore is actually moved through this zone as distinguished from being stationary therein on a batch basis.

The material leaving this post roasting zone is substantially of the following composition; the iron and chromium are in the form of their oxides, Fe₂O₃ and Cr₂O₃. These materials and the gangue initially present, plus some non-chloridized manganese and/or magnesium compounds constitute substantially the water-insoluble fraction of the material in this stage, the remaining (water-soluble) material consisting essentially of the chloridized nickel, cobalt, magnesium and manganese, and possibly some calcium.

The next operation is a leaching to effect a separation between the water-soluble and the water-insoluble fractions as aforesaid. This leaching operation may be essentially conventional. It is preferably carried out in several stages or in some manner as to assure thorough separation of all water-soluble constituents of the ore. Following the leaching per se, or as a part of one stage thereof, the water-soluble portion of the material is separated from the water-insoluble portion by filtration or decantation or some combination of the two.

The water-insoluble material, which contains substantially all the iron oxide and chromium oxide, may then be treated by one or more steps, which per se form no part of the present invention, for the recovery of iron, chromium or both. The present invention is concerned particularly with the recovery of metal values from the water-soluble portion separated as aforesaid.

In the event that there is sufficient cobalt in the raw material being worked upon, so that it is desired to separate this cobalt and recover it separately from the nickel which may be present, the next step is performed at this time. This step is thus optional, as in the event that the cobalt is not sufficient in amount, or for some reason it is not desired to recover it as such, it may be recovered along with the nickel by the mere omission of the present step. This step involves utilization of the fact that cobalt chloride ($CoCl_2$) is selectively soluble in 2-octanol, while the corresponding nickel chloride ($NiCl_2$) is substantially less soluble in 2-octanol. The step involves, therefore, an extraction with 2-octanol of material prepared as aforesaid and conditioned to make the selective action of 2-octanol as great as desired.

Certain prior art teachings have indicated that 2-octanol is effective to dissolve cobalt chloride to a greater extent than nickel chloride, so that this material, 2-octanol, may be used to extract cobalt chloride from aqueous solutions thereof with nickel chloride. In practically all instances the two chlorides were present in substantially equal amounts in the tests made in accordance with the prior art and the selectivity proven indicated a greater affinity of the 2-octanol for cobalt chloride than nickel chloride; although the prior art did not succeed in effecting substantially complete separation of the two, particularly when they were admixed with other chlorides as in the material available in accordance with the present invention at the termination of the leaching operation.

The present invention contemplates that the product of the leaching operation will be an aqueous solution of greater or less concentration in accordance with the particular leaching process used and which may, if desired, be evaporated to increase the concentration thereof. This material, when the present solvent extraction step is used, contains nickel chloride, cobalt chloride and at least one of the chlorides of manganese and magnesium, and possibly also calcium chloride. The extraction which is carried on in accordance with the present invention utilizes 2-octanol and preferably utilizes this material under conditions in which the 2-octanol phase (which is immiscible with the aqueous phase) is quite highly acidic with HCl. The making of the 2-octanol phase acidic may be effected by adding aqueous HCl or gaseous HCl to the aqueous phase or by treating the 2-octanol with gaseous HCl or with an aqueous solution of HCl, as shown in the flow sheet comprising the accompanying drawing.

The extraction is effected in any suitable liquid-liquid extraction apparatus, many of which are known to the art, and is preferably accompanied by very substantial agitation of the two liquids. When this is accomplished according to the present invention, it is found that substantially all the cobalt chloride will be dissolved in the 2-octanol phase, while substantially all the nickel chloride will be dissolved in the aqueous phase. The other chlorides which may be present, i. e. the chlorides of magnesium, manganese and calcium, will be in part dissolved in one phase and in part in the other phase. It is recognized that the theoretically complete selective extraction referred to above, which represents substantially equilibrium conditions under all the circumstances, may not be attained in practical commercial operation, as it might involve the use of equipment of larger size or for greater time periods than is considered economic for any particular installation. There is, however, a substantial selectivity in the solution potential of 2-octanol for cobalt chloride as distinguished from nickel chloride, which is taken advantage of in accordance with the present invention and which is shown in a table which follows, the table representing substantial equilibrium for the particular conditions set forth. It is further contemplated that in most instances there will be a concentration of HCl in the aqueous phase, after the completion of the extraction operation, preferably in the order of about 5% to about 15% (by weight). There will also be a certain concentration of HCl in the 2-octanol phase at this time. There is reported in Table I below certain data obtained from a series of tests showing the distribution of nickel and cobalt (as chlorides, but calculated to a metal basis) in the two phases after completion of extraction operations as aforesaid. The table as given represents only a part of the data actually available, but is deemed sufficient to illustrate the selectivity resulting from the process involving 2-octanol extraction as aforesaid. In the last column in this table there is given the ratio of the solution constant for cobalt, divided by the solution constant for nickel. In each instance the solution constant (K) is equal to the percent by weight of nickel or cobalt respectively in the solvent or 2-octanol phase, divided by the percent by weight of the same material respectively in the water phase. The ratio tabulated in the last column is the ratio of these two solution constants. Thus, the higher the figure in the last column, the greater is the selectivity. As a practical matter, it is usually desired that the conditions, including total chlorides, HCl concentration and the concentration of soluble salts be so chosen and the solutions so adjusted that the ratio given in the last column shall be greater than 100 and preferably as high as possible.

TABLE I

| Laboratory Test | Percent by Weight—Water Phase after extraction | | | | Distribution Coefficient, Ratio $K_{Co}/K_{Ni}$ |
| --- | --- | --- | --- | --- | --- |
| | Total Cl | HCl | Ni | Co | |
| a | 20.63 | 1.40 | 4.407 | 4.202 | 13.7 |
| b | 21.07 | 13.05 | 2.200 | .437 | 29.5 |
| c | 22.66 | 15.03 | 2.067 | .384 | 56.9 |
| d | 22.68 | 3.55 | 8.194 | .549 | 82.8 |
| e | 24.41 | 14.51 | 2.689 | .458 | 117.1 |
| f | 24.80 | 9.76 | 4.376 | .0199 | 216.4 |
| g | 25.74 | 14.59 | 3.214 | .502 | 160.0 |

Furthermore, experimental work has indicated that the extraction aforesaid is preferably carried out at substantially room or ambient temperature and that operations at higher temperatures introduce certain disadvantageous factors which it is desired to avoid.

Following the extraction, which is preferably carried on as indicated in the accompanying drawing, as in the first extractor, the two phases are separated, the water phase being the lower one by reason of its greater density. The water phase which contains all or substantially all the nickel chloride is then taken to a nickel salt concentrator and there evaporated to dryness. The 2-octanol phase, which is withdrawn as shown from the top of the first extractor, is taken to a second extractor where the water-soluble salts contained therein, including substantially all the cobalt chloride, are extracted therefrom by water. Again the water phase in the second extractor is separated from the 2-octanol phase and the latter returned for reuse in the first extractor. As shown in the flow sheet of the accompanying drawing, acidification may be effected by supplying HCl solution to the 2-octanol enroute to its re-use between the second extractor and the first extractor.

The water phase separated from the 2-octanol phase in the second extractor and which has contained therein as a solute a group of mixed chlorides, particularly including the recovered and separated cobalt chloride, may then be transferred to the cobalt salt concentrator and there evaporated to dryness to produce a group of mixed chlorides, which may be treated in a manner more or less parallel to the treatment of the nickel-containing salts, but preferably separate therefrom.

While it is contemplated that the separated nickel and cobalt-containing groups of salts may be treated for the separate recovery of nickel and cobalt by process steps conventional in the prior art, the present invention particularly contemplates that these groups of salts shall be treated by more or less parallel processes for the recovery of nickel or nickel plus cobalt (if the 2-octanol extraction step is omitted), on the one hand, and cobalt on the other.

The preferred process for recovery of nickel, or nickel and cobalt, will first be described. This process involves the selective reduction of nickel or nickel plus cobalt, while preventing conversion of substantial amounts of the other chlorides which may be present to any water-insoluble form. This is accomplished in a selective reducing device by treating the mixed salts, at a temperature preferably in the range of about 620° F. to about 1160° F., with a gaseous reducing agent containing HCl and hydrogen in a ratio to one another as set forth in the following table. A third gaseous agent is always present to a greater or less extent, i. e. water vapor. It is further necessary that the water vapor content shall not exceed particular values, which again are a function of temperature as set forth in the table which follows. Thus, the present process involves treatment of the mixed salts at a temperature and within the limiting conditions set forth in the following table:

TABLE II

| Temperature, °F. | Maximum H₂O Content (Vol. Percent) | Minimum Ratio HCl/H₂O (Vol. Percent) | Maximum Ratio HCl/H₂ (Vol. Percent) |
| --- | --- | --- | --- |
| 620 | 27 | 0.11 | 0.04 |
| 800 | 32 | 0.42 | 0.24 |
| 980 | 27 | 1.4 | 1.1 |
| 1,160 | 15 | 4.5 | 4.1 |

The figures given in the table represent absolute limiting values, so that it is preferred that the actual values to be used shall be some substantial distance away from these values in the direction indicated respectively. Thus, for example, the value given for water content is a maximum value. The preferred values are as little as possible. The maximum ratio of HCl to hydrogen is given in the table above. It is preferred, however, that this ratio shall be as low as possible so as to get rapid reduction. On the other hand, there is a minimum ratio of HCl to water vapor which must be present in order that undesired results, particularly hydrolysis of manganese and/or magnesium salts, shall be avoided. The optimum conditions, therefore, are obtained when the water content is held as low as possible. The gaseous composition for this selective reducing action is given without reference to the possible presence in the gases of one or more inert gases in varying amounts. The presence of such inert gases as nitrogen is not precluded by anything herein contained as long as the other factors are present within the limits given.

In a similar manner, the cobalt-containing salts may be selectively reduced, again by the use of the same type gaseous mixture, but with somewhat different limitations than those set forth in Table II above. The limiting factors for cobalt reduction comparable in every respect to the limiting factors in Table II are given hereinbelow in Table III, which follows:

TABLE III

| Temperature, °F. | Maximum H₂O Content (Vol. Percent) | Minimum Ratio HCl/H₂O (Vol. Percent) | Maximum Ratio HCl/H₂ (Vol. Percent) |
| --- | --- | --- | --- |
| 620 | 47 | .11 | 0.1 |
| 800 | 54 | .42 | 1.0 |
| 980 | 39 | 1.4 | 10 |
| 1,160 | 18 | 4.5 | 100 |

The several comments given above as to Table II are similarly qualitatively applicable to Table III, once the different values in these tables respectively are taken into account.

Following the selective reduction operations, the products in each instance are subjected to a leaching operation with water, so as to separate the reduced metals which it is desired to save as products of the process, i. e. nickel or nickel plus cobalt, on the one hand, and cobalt on the other hand. The soluble products resulting from the leaching operations per se may then be filtered or otherwise separated from the non-water soluble materials. The metal products which are insoluble and which may be separated out by the filtration operations aforesaid may then be dried as products of the process. The filtrates from these two filtration operations, following the respective leaching operation, may then be combined, concentrated and hydrolyzed for the recovery of the chlorine content thereof (present as chloride), which is important from an economic point of view. If desired, the solid products of this hydrolysis may be further treated for the recovery of manganese or magnesium, or both, and in either case by processes conventional in the art and which per se form no part of the present invention.

The process of the present invention is further illustrated by the following examples:

*Example I*

This example is given to illustrate the operation of the entire process as applied to the handling and recovery of metal values from two different ores, both of which are found in Cuba, the ores being (a) Nicaro limonite, and (b) Moa limonite. Both ores as received from the mine are very fine and usually do not need much grinding. The ores have been studied and the present processes carried through in respect thereto on a laboratory scale in each instance. The laboratory results were then calculated over to a basis of 2,000 pounds (one short ton) of the starting ore in each case so as to give figures which are comparable for the purpose of the present disclosure. The initial ore composition is as follows:

| | (a) Nicaro (lbs.) | (b) Moa (lbs.) |
| --- | --- | --- |
| Free moisture | 546.4 | 546 |
| Combined water | 145 | 141.8 |
| Fe (calculated as metal) | 712 | 698 |
| Ni | 19.33 | 22.6 |
| Co | 1.45 | 2.48 |
| Mn | 6.11 | 16.6 |
| Mg | 17.59 | 13.1 |
| Ca | 1.45 | 0.71 |

Both ores were dried at about 350° F. to drive off the moisture and a part of the chemically combined water. The ores were next chloridized by selective chloridizing at 530° F. for 40 minutes in the presence of steam using a 1:1 ratio of HCl and H₂O, and where thereafter subjected to a post roasting operation in the presence of air starting at 530° F. and thereafter cooling to room temperature. The product of this post roasitng was then subjected to an aqueous leach. Prior to this leach, the soluble materials subjected thereto had the following weights:

| Ingredient | Ore (a) (lbs.) | Ore (b) (lbs.) |
| --- | --- | --- |
| NiCl₂ | 35.00 | 40.8 |
| CoCl₂ | 2.61 | 5.01 |
| FeCl₂ | 0.14 | 0.14 |
| MnCl₂ | 10.92 | 20.87 |
| MgCl₂ | 11.00 | 3.59 |
| CaCl₂ | 4.02 | nil |
| Solid insolubles | 1,230 | 1,272 |

Subsequent to the leach and as a result thereof, there was produced an aqueous solution having the following composition:

| Ingredient | Ore (a) (lbs.) | Ore (b) (lbs.) |
| --- | --- | --- |
| NiCl₂ | 34.30 | 40.0 |
| CoCl₂ | 2.56 | 4.9 |
| FeCl₂ | 0.14 | 0.14 |
| MnCl₂ | 10.70 | 20.45 |
| MgCl₂ | 10.78 | 3.5 |
| CaCl₂ | 3.94 | nil |
| Water | 353.9 | 399 |

The water-soluble portions separated by filtration following the leaching operations for each ore was then concentrated by evaporation. The concentrated solutions were then extracted by agitating them with 2-octanol. Prior to this extraction, however, the water solution was acidified, while preventing dilution thereof, by bubbling gaseous HCl therethrough. In this way the HCl concentration of the water solution was brought up to about 16%, and the total chlorine concentration (as chloride), after giving effect to the HCl content was brought to about 27% or about 95% of saturation. The figures given above related to ore (a). The corresponding figures as to ore (b) are as follows: HCl concentration in the water solution 9.8%; total chlorine concentration (as chloride) in solution including HCl 30%, which was 98% of saturation. The volume of 2-octanol used was about 8.5 times the volume of the aqueous solution in each instance.

Following the completion of the extraction, the water phase as to each ore was evaporated to dryness, giving 58.9 lbs. of metal chlorides for ore (a) and 63.3 lbs. for ore (b) on the same ton basis set forth. These nickel-containing salts were then reduced selectively at about 980° F. temperature using a gas having a concentration (by volume) of the critical elements as follows: H₂O 3%, HCl 6% and hydrogen 91%. The product of this selective reduction, which took place in about 2½ hours was then leached and filtered to yield 14.8 lbs. of nickel for ore (a) and 17.4 lbs. of nickel for ore (b).

In a substantially parallel manner, the 2-octanol phase from the first extraction was itself extracted with water in a second extraction, separated from this second water phase, and the latter was evaporated to dryness to give dry cobalt-containing salts in the amount of 2.3 lbs. on the same ton basis aforesaid for ore (a) and 4.4 lbs. for ore (b). The cobalt-containing salts were then selectively reduced by treating them in a reducing zone at about 980° F. for about 2½ hours with a gas having as its three essential ingredients the following (by volume in each instance): 5% water, 10% HCl and 85% hydrogen. There resulted a reduced material which when leached and separated, yielded 1.0 lb. of cobalt on the same basis given above for ore (a) and 1.9 lbs. for ore (b).

While there is disclosed herein certain essential steps of the process of the present invention and certain alternatively usable steps, the foregoing disclosure will suggest alternatives as to various process steps or portions thereof to those skilled in the art. We do not wish to be limited, therefore, except by the scope of the appended claims, which are to be construed validly as broadly as the state of the art permits.

What is claimed is:

1. The process of recovering metal values from solid ore material containing iron, nickel and at least one of the elements: manganese and magnesium, comprising the steps of chloridizing the solid material at a temperature in the range of about 400° to 600° F. by passing in intimate contact therewith a gaseous mixture containing hydrogen chloride and water vapor in the ratio to each other from about 2:1 to about 1:2, so as to chloridize a maximum amount of the nickel present to form NiCl₂, while substantially suppressing chloridization of iron to the form of FeCl₃; leaching the solid material, after it is cooled following the chloridizing step aforesaid, with an aqueous liquid and then dividing the material into a water-insoluble portion including gangue present in the original ore, iron oxide and chromium present in the original ore in the form of oxide, and a water-soluble portion including chlorides of nickel, cobalt, magnesium and manganese which were present in the original ore and which were chloridized in the chloridizing step; evaporating said soluble portion to leave the chlorides aforesaid in solid form; selectively reducing nickel and cobalt present as chlorides without at the same time converting substantial amounts of the chlorides of magnesium and manganese which may be present to any water-insoluble form, by contacting said remaining chlorides in a reducing zone and at a temperature in the range of about 620° F. to about 1160° F. with a gaseous reducing atmosphere containing hydrogen, hydrogen chloride and water vapor within the limiting conditions set forth in the following table:

| Temperature, °F. | Maximum H₂O Content (Vol. Percent) | Minimum Ratio HCl/H₂O (Vol. Percent) | Maximum Ratio HCl/H₂ (Vol. Percent) |
| --- | --- | --- | --- |
| 620 | 27 | 0.11 | 0.04 |
| 800 | 32 | 0.42 | 0.24 |
| 980 | 27 | 1.4 | 1.1 |
| 1,160 | 15 | 4.5 | 4.1 | leaching the reduced material produced as aforesaid with water to separate metallic nickel from the remaining water-soluble material.

2. The process in accordance with claim 1, in which the ore to be treated includes some chemically combined water, said process comprising the step effected on the initial ore of drying such ore, while in a finely divided state, at a temperature in the range of about 250° to about 500° F., so as to drive off any chemically uncombined water present and a part only of the chemically combined water of the ore.

3. The process in accordance with claim 2, comprising effecting the drying step aforesaid with the ore in the presence of an oxygen-containing atmosphere, so as substantially to prevent the reduction of iron present in the ore from a ferric to a ferrous state during such drying.

4. The process in accordance with claim 1, comprising the additional step, effected after the chloridizing step and prior to the first named leaching step both aforesaid, of roasting the chloridized material while passing air in contact therewith, so as to oxidize FeCl₃ which may be present to Fe₂O₃, and thereafter cooling the roasted material.

5. The process of selectively reducing nickel from a starting material consisting essentially of a mixture of the chlorides of nickel and at least one of the metals: magnesium and manganese, without at the same time converting substantial amounts of the chlorides of magnesium and manganese which may be present in said starting material to a water-insoluble form, said process comprising the steps of contacting said chlorides in a reducing zone and at a temperature in the range of about 620°

F. to about 1160° F. with a gaseous reducing atmosphere containing hydrogen, hydrogen chloride and water vapor within the limiting conditions set forth in the following table:

| Temperature, °F. | Maximum H₂O Content (Vol. Percent) | Minimum Ratio HCl/H₂O (Vol. Percent) | Maximum Ratio HCl/H₂ (Vol. Percent) |
|---|---|---|---|
| 620 | 27 | 0.11 | 0.04 |
| 800 | 32 | 0.42 | 0.24 |
| 980 | 27 | 1.4 | 1.1 |
| 1,160 | 15 | 4.5 | 4.1 | leaching the reduced material produced as aforesaid with water to separate metallic nickel from the remaining water-soluble material.

6. The process in accordance with claim 5, in which some cobalt chloride is present in said starting material along with the nickel chloride, and in which the cobalt chloride present is reduced to metallic cobalt simultaneously with the reduction of the nickel chloride to metallic nickel.

7. The process of selectively reducing cobalt from a starting material consisting essentially of a mixture of the chlorides of cobalt and at least one of the metals: magnesium and manganese, without at the same time converting substantial amounts of the chlorides of magnesium and manganese which may be present in said starting material to a water-insoluble form, said process comprising the steps of contacting said chlorides in a reducing zone and at a temperature in the range of about 620° F. to about 1160° F. with a gaseous reducing atmosphere containing hydrogen, hydrogen chloride and water vapor within the limiting conditions set forth in the following table:

| Temperature, °F. | Maximum H₂O Content (Vol. Percent) | Minimum Ratio HCl/H₂O (Vol. Percent) | Maximum Ratio HCl/H₂ (Vol. Percent) |
|---|---|---|---|
| 620 | 47 | .11 | 0.1 |
| 800 | 54 | .42 | 1.0 |
| 980 | 39 | 1.4 | 10 |
| 1,160 | 18 | 4.5 | 100 | leaching the reduced material produced as aforesaid with water to separate metallic cobalt from the remaining water-soluble material.

8. The process of recovering metal values from solid ore material containing iron, nickel, cobalt and at least one of the elements: manganese and magnesium, comprising the steps of chloridizing the solid material at a temperature in the range of about 400° to 600° F. by passing in intimate contact therewith a gaseous mixture containing hydrogen chloride and water vapor in the ratio to each other from about 2:1 to about 1:2, so as to chloridize a maximum amount of the nickel and cobalt present to form NiCl₂ and CoCl₂ respectively, while substantially suppressing chloridization of iron to the form of FeCl₃; leaching the solid material, after it is cooled following the chloridizing step aforesaid, with an aqueous liquid and then dividing the material into a water-insoluble portion including any gangue present in the original ore, iron and any chromium present in the original ore both in the form of oxides, and a water-soluble portion including chlorides of nickel, cobalt, magnesium and manganese which were present in the original ore and which were chloridized in the chloridizing step; extracting said water-soluble portion with 2-octanol by bringing said portion and said 2-octanol into mutual contact in the presence of a predetermined concentration of HCl, so as to dissolve from said water-soluble portion and into the 2-octanol phase a maximum amount of the cobalt chloride present, separating the 2-octanol phase from the aqueous phase following the extraction, recovering nickel from the material dissolved in said aqueous phase, and recovering cobalt from the material dissolved in said 2-octanol phase.

9. The process in accordance with claim 8, in which said water-soluble portion is prepared, prior to the 2-octanol extraction thereof, so as to have a concentration of dissolved chlorides therein from about 75% to 100% of saturation.

10. The process in accordance with claim 9, in which the aqueous solution to be extracted by the 2-octanol is prepared, at least in part, by establishing therein an HCl concentration from about 5% to about 15%.

11. The process according to claim 8, in which the presence of said HCl is established by first establishing a predetermined HCl concentration in the 2-octanol to be used in the extraction step aforesaid, then carrying out said extraction step with the HCl-acidified 2-octanol.

12. The process in accordance with claim 8, in which the aqueous phase, following the 2-octanol extraction aforesaid, is treated for the recovery of nickel therefrom by evaporating said aqueous phase to dryness to leave the chloride salts present therein in solid form, selectively reducing the solid chlorides prepared as aforesaid to reduce the nickel chloride therein selectively to form metallic nickel, without at the same time converting substantial amounts of the chlorides of magnesium, manganese or calcium which may be present to any water-insoluble form, by contacting these chlorides in a reducing zone and at a temperature in the range of about 620° F. to about 1160° F. with a gaseous reducing atmosphere containing hydrogen, hydrogen chloride and water vapor within the limiting conditions set forth in the following table:

| Temperature, °F. | Maximum H₂O Content (Vol. Percent) | Minimum Ratio HCl/H₂O (Vol. Percent) | Maximum Ratio HCl/H₂ (Vol. Percent) |
|---|---|---|---|
| 620 | 27 | 0.11 | 0.04 |
| 800 | 32 | 0.42 | 0.24 |
| 980 | 27 | 1.4 | 1.1 |
| 1,160 | 15 | 4.5 | 4.1 | leaching the reduced material produced as aforesaid with water to separate metallic nickel from the remaining water-soluble material.

13. The process in accordance with claim 8, comprising the additional steps of extracting with water the 2-octanol phase, after it has been separated from the aqueous phase as aforesaid, so as to recover therefrom water-soluble cobalt chloride and so as to leave the 2-octanol in a condition for reuse as aforesaid, evaporating the water solution of cobalt chloride prepared as aforesaid to dryness, to give a mixture of the chlorides of cobalt plus such other of the metal chlorides as were extracted by the 2-octanol, selectively reducing cobalt from this mixture of chlorides, without at the same time converting substantial amounts of the chlorides of magnesium, manganese or calcium which may be present therein to any water-insoluble form by contacting said mixture of chlorides in a reducing zone and at a temperature in the range of about 620° F. to about 1160° F. with a gaseous reducing atmosphere containing hydrogen, hydrogen chloride and water vapor within the limiting conditions set forth in the following table:

| Temperature, °F. | Maximum H₂O Content (Vol. Percent) | Minimum Ratio HCl/H₂O (Vol. Percent) | Maximum Ratio HCl/H₂ (Vol. Percent) |
|---|---|---|---|
| 620 | 47 | .11 | 0.1 |
| 800 | 54 | .42 | 1.0 |
| 980 | 39 | 1.4 | 10 |
| 1,160 | 18 | 4.5 | 100 | leaching the reduced material produced as aforesaid with water to separate metallic cobalt from the remaining water-soluble material.

14. The process in accordance with claim 8, comprising the additional steps of treating said aqueous phase, following the 2-octanol extraction aforesaid, for the recovery of nickel therefrom by evaporating said aqueous phase to leave the chloride salts present therein in solid form, selectively reducing the solid chlorides prepared as aforesaid to reduce the nickel chloride therein selectively to form metallic nickel, without at the same time converting substantial amounts of the chlorides of magnesium, manganese or calcium which may be present, to any water-insoluble form, by contacting these chlorides in a reducing zone and at a temperature in the range of about 620° F. to about 1160° F. with a gaseous reducing atmosphere containing hydrogen, hydrogen chloride and water vapor within the limiting conditions set forth in the following table:

| Temperature, °F. | Maximum $H_2O$ Content (Vol. Percent) | Minimum Ratio $HCl/H_2O$ (Vol. Percent) | Maximum Ratio $HCl/H_2$ (Vol. Percent) |
|---|---|---|---|
| 620 | 27 | 0.11 | 0.04 |
| 800 | 32 | 0.42 | 0.24 |
| 980 | 27 | 1.4 | 1.1 |
| 1,160 | 15 | 4.5 | 4.1 | leaching the reduced material produced as aforesaid with water to separate metallic nickel from the remaining water-soluble material; extracting with water the 2-octanol phase, after it has been separated from the aqueous phase as aforesaid, so as to recover therefrom water-soluble cobalt chloride and so as to leave the 2-octanol in a condition for reuse as aforesaid, evaporating the water solution of cobalt chloride prepared as aforesaid to dryness, to give a mixture of the chlorides of cobalt plus such other of the metal chlorides as were extracted by the 2-octanol, selectively reducing cobalt from this mixture of chlorides, without at the same time converting substantial amounts of the chlorides of magnesium, manganese or calcium which may be present therein to any water-insoluble form by contacting said mixture of chlorides in a reducing zone and at a temperature in the range of about 620° F. to about 1160° F. with a gaseous reducing atmosphere containing hydrogen, hydrogen chloride and water vapor within the limiting conditions set forth in the following table:

| Temperature, °F. | Maximum $H_2O$ Content (Vol. Percent) | Minimum Ratio $HCl/H_2O$ (Vol. Percent) | Maximum Ratio $HCl/H_2$ (Vol. Percent) |
|---|---|---|---|
| 620 | 47 | .11 | 0.1 |
| 800 | 54 | .42 | 1.0 |
| 980 | 39 | 1.4 | 10 |
| 1,160 | 18 | 4.5 | 100 | leaching the reduced material produced as aforesaid with water to separate metallic cobalt from the remaining water-soluble material.

References Cited in the file of this patent
UNITED STATES PATENTS

| | | |
|---|---|---|
| 2,036,664 | Wescott | Apr. 7, 1936 |
| 2,067,874 | Brown et al. | Jan. 12, 1937 |